United States Patent [19]
Kigawa et al.

[11] Patent Number: 5,963,645
[45] Date of Patent: Oct. 5, 1999

[54] RECEPTION APPARATUS, RECEPTION METHOD, TRANSMISSION APPARATUS, TRANSMISSION METHOD, TRANSMISSION-RECEPTION APPARATUS, AND TRANSMISSION-RECEPTION METHOD

[75] Inventors: Naoki Kigawa; Masayuki Miyagawa; Yoshimoto Muratsubaki; Kazuhiro Akaike, all of Kanagawa; Mika Ito, Tokyo; Yuriko Kishitaka, Saitama; Yasuhiro Muramatsu, Tokyo, all of Japan

[73] Assignee: Sony Corporation, Tokyo, Japan

[21] Appl. No.: 08/775,514

[22] Filed: Jan. 2, 1997

[30] Foreign Application Priority Data

Jan. 10, 1996 [JP] Japan ................................ 8-001913

[51] Int. Cl.⁶ .............................. H04L 9/00; H04N 7/167
[52] U.S. Cl. .................................. 380/10; 380/9; 380/49; 348/6; 455/3.1; 455/6.1
[58] Field of Search ........................... 380/9, 10, 20, 380/49, 50, 59, 23, 25; 455/3.1, 4.1, 4.2, 5.1, 6.1, 6.2, 6.3; 348/6, 7, 8, 9, 10, 11, 12, 13, 1; 705/1, 26, 27

[56] References Cited

U.S. PATENT DOCUMENTS

| | | |
|---|---|---|
| 5,473,609 | 12/1995 | Chaney . |
| 5,534,911 | 7/1996 | Levitan ............................... 348/1 |
| 5,636,346 | 6/1997 | Saxe ................................... 705/1 |
| 5,721,827 | 2/1998 | Logan et al. ...................... 348/13 X |

FOREIGN PATENT DOCUMENTS

WO 94 14280 6/1994 WIPO .
WO 94 29811 12/1994 WIPO .

OTHER PUBLICATIONS

Bestler, C.: "Flexible Data Structures and Interface Rituals for Rapid Development of OSD Applications", Proceedings from Eleven Technical Sessions of the Annual Convention and Exposition of the National Cable Television Association, San Francisco, Jun. 6–9, 1993, No. Convention 42, Jun. 6, 1993, Rutkowski, K., pp. 223–236.

*Primary Examiner*—Bernarr E. Gregory
*Attorney, Agent, or Firm*—Frommer Lawrence & Haug, LLP.; William S. Frommer

[57] ABSTRACT

A reception apparatus for receiving a broadcast signal which is transmitted from a transmitting side and which includes personalized information comprising data representing information about specific programs targeted for a specific viewer. The reception apparatus comprises: an extraction unit for extracting the data representing the information about the specific programs from the broadcast signal received; and a display unit for displaying the information about the specific programs on the basis of the data representing the information about the specific programs.

17 Claims, 13 Drawing Sheets

F I G. 1
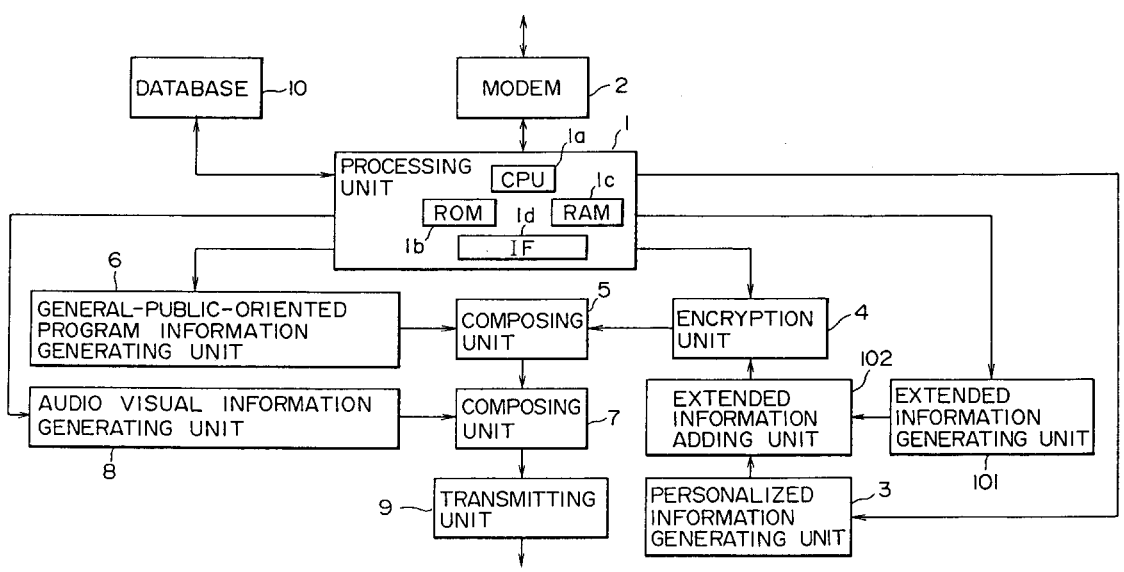

FIG. 8

```
RECOMMENDED PROGRAM LIST

1 「o o    o o」(MOVIE)

2 「△ △  △ △」(SIMULATION GAME)

3 「x x  x x」(LIVE PERFORMANCE)

4 「▫ ▫ ▫ ▫」(SHARE PRICE
              QUOTATIONS)

PLEASE MAKE A SELECTION
```

ORIGINAL WRITTEN BY: ◇ ◇ ◇ ◇

STARRING:  ✳ ✳ ✳ ✳

DIRECTED BY:  ☆ ☆ ☆ ☆

RUNNING TIME: 125 MIN.

VIEWING FEE: ¥700

PLOT: · · · · · ·
```

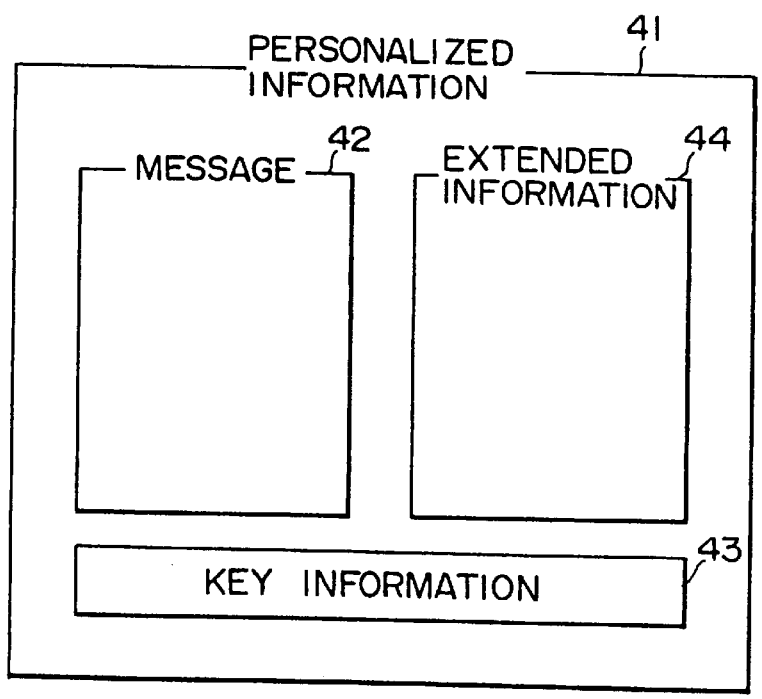

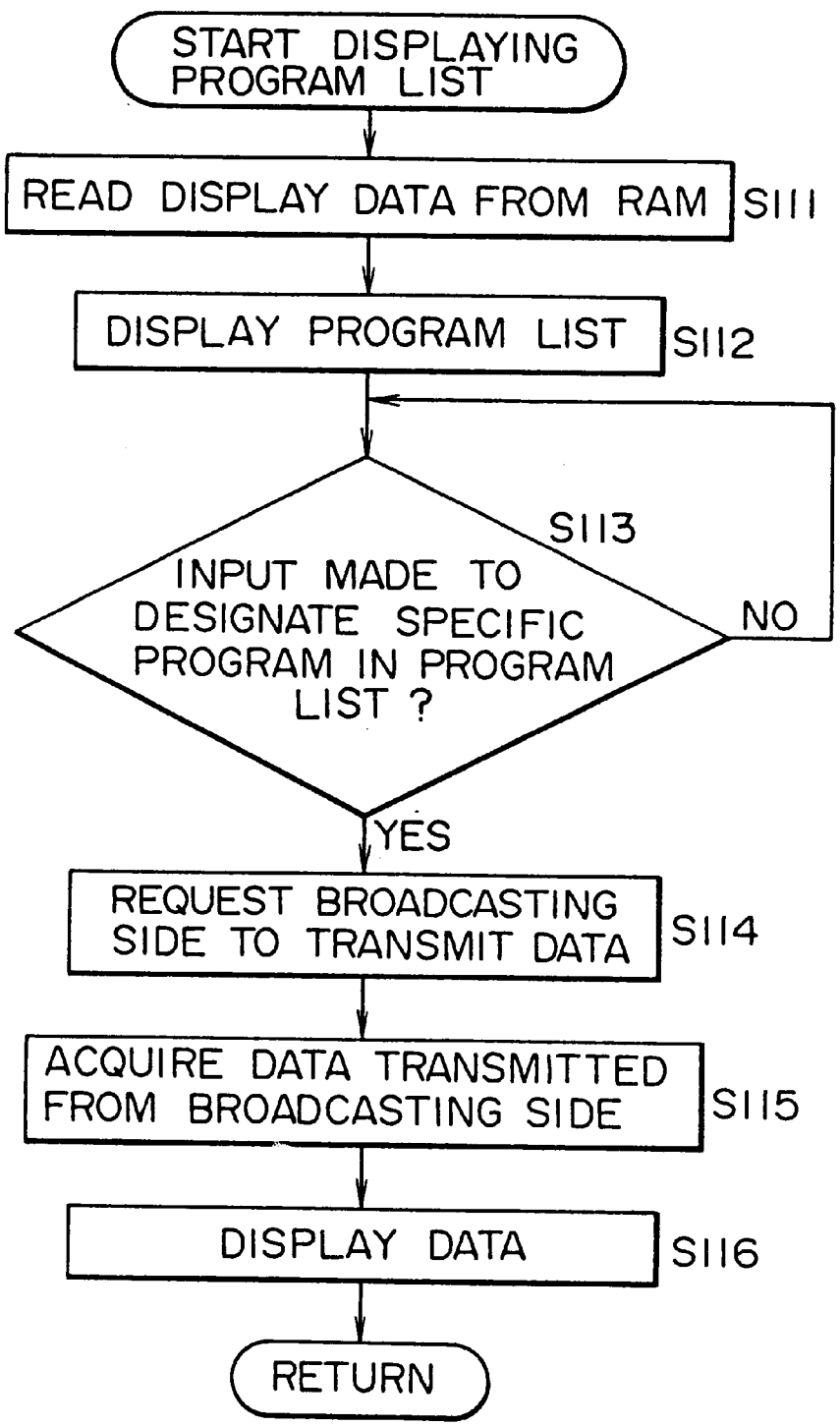

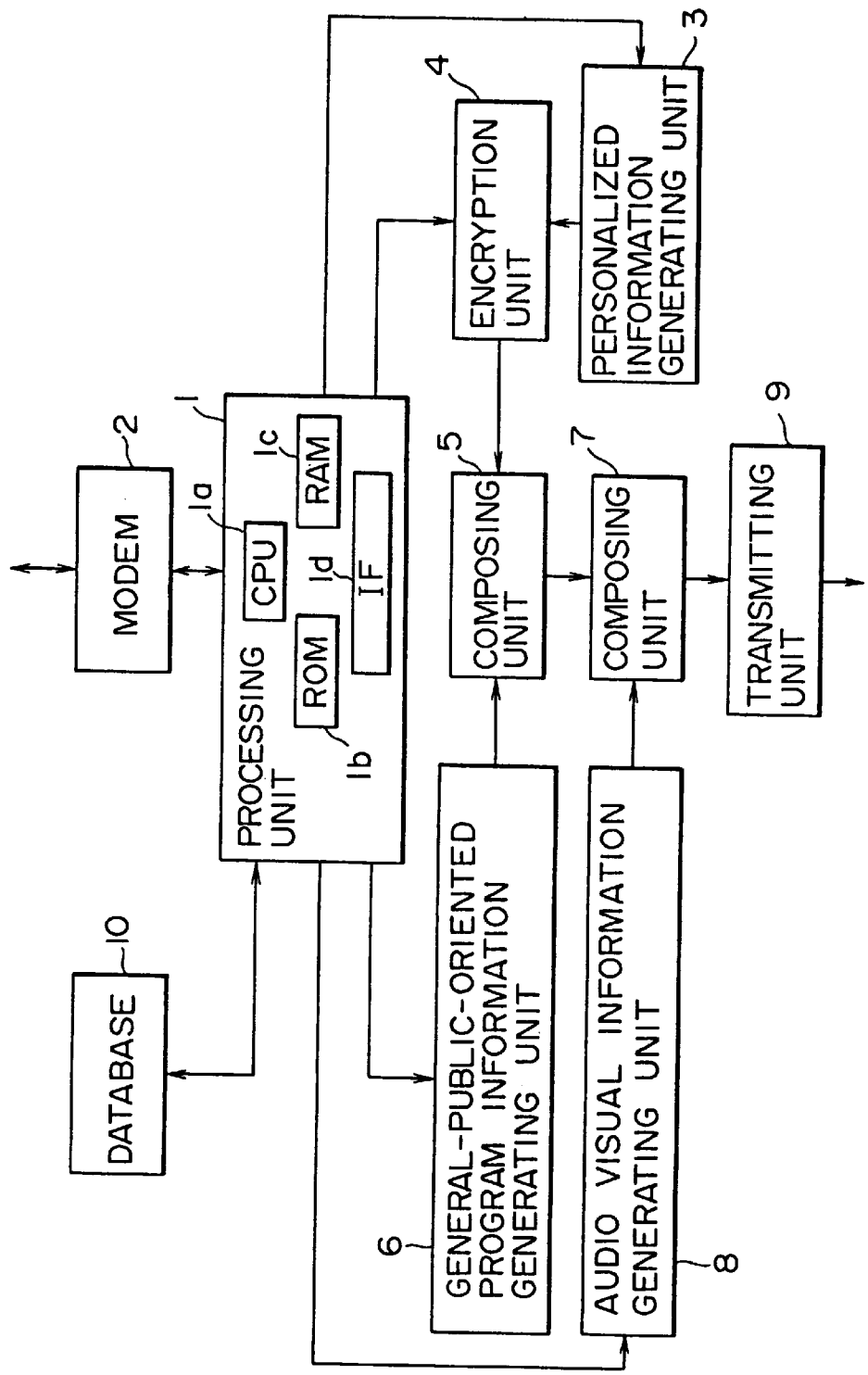

ns, a
RECEPTION APPARATUS, RECEPTION METHOD, TRANSMISSION APPARATUS, TRANSMISSION METHOD, TRANSMISSION-RECEPTION APPARATUS, AND TRANSMISSION-RECEPTION METHOD

BACKGROUND OF THE INVENTION

The present invention relates to a reception apparatus, a reception method, a transmission apparatus, a transmission method, a transmission-reception apparatus, and a transmission-reception method. More particularly, the invention relates to a program selection support apparatus, a program selection support method, a reception apparatus, a reception method, a transmission apparatus, a transmission method, a transmission-reception apparatus, and a transmission-reception method whereby information edited for specific viewers is transmitted, received and reproduced.

Recent advances in information compression technology combined with novel data transmission channels having greater capacities and affording higher transmission speeds have made it possible to transmit an increasingly large number of programs to viewers. With more programs to choose from, the so-called program selection support apparatus is now playing an important role in helping viewers to select desired programs.

The program selection support apparatus illustratively displays the viewing fee of any designated program, the broadcast time of the designated program, type of information to be broadcast (e.g., images, voice, data), a plot of the program, and a list of programs to be broadcast on specific days, so that viewers may select desired programs with ease.

By referencing the past viewing history of each viewer, the program selection support apparatus may retrieve and display personalized information (message) edited by the broadcasting side.

FIG. 15 is a block diagram outlining the constitution of a related art digital television broadcast transmission apparatus. In this block diagram, personalized information is information which is edited by the broadcasting side for specific viewers. For example, personalized information may include key information for allowing a specific viewer to descramble scrambled programs and a message addressed by the broadcasting side to that viewer. General-public-oriented information is information which may be received by all viewers, and illustratively includes EPG (electrical program guide) information for supporting program selection.

In FIG. 15, a processing unit 1 comprises a CPU (central processing unit) 1a, a ROM (read only memory) 1b, a RAM (random access memory) 1c and an interface (IF) 1d. The processing unit 1 controls the apparatus as a whole and performs various computations. A modem 2 receives information through a telephone line from viewers (e.g., information indicating that a specific program has been viewed, information for making a merchandise purchase contract, etc.), demodulates it, and supplies the demodulated information to the processing unit 1.

A personalized information generating unit 3 generates personalized information. An encryption unit 4 encrypts personalized information. A general-public-oriented program information generating unit 6 generates program information destined for the general public. A composing unit 5 composes personalized information from the encryption unit 4 and general-public-oriented program information from the general-public-oriented program information generating unit 6.

An audio visual information generating unit 8 generates information about a plurality of programs composed of images, voice and data (i.e., audio visual information) and, if necessary, scrambles information about specific programs. A composing unit 7 composes information from the audio visual information generating unit 8 and information from the composing unit 5. A transmitting unit 9 transmits information from the composing unit 7 to viewers. A database 10 stores information about subscription contracts with viewers, about their viewing history, and other information.

Personalized information is encrypted by the encryption unit 4 to ensure security. This means that encrypted personalized information is used only by specifically authorized viewers.

FIG. 16 is a block diagram outlining the constitution of a related art program selection support apparatus on the receiving side (i.e., an apparatus for receiving signals sent by the apparatus of FIG. 15) In FIG. 16, a tuner 21 receives information from the broadcasting side and forwards the received information to a separation processing unit 22. The separation processing unit 22 separates the received information into personalized information, general-public-oriented information and audio visual information. A decoder decodes (i.e., deciphers) encrypted personalized information so as to extract a message and key information therefrom.

FIG. 17 is a view of a typical data structure of related art personalized information containing a message and key information. As illustrated, a message 42 and key information 43 are each included independently in personalized information 41.

A display unit 24 is arranged to display the message 42 extracted by the decoder 23. Typically, the display unit 24 may be a CRT (cathode ray tube) display unit or an LCD (liquid crystal display) unit.

An audio visual processing unit 25 selects information about any specific program from the audio visual information separated by the separation processing unit 22, so as to extract audio and visual information included in the program information. When necessary, the audio visual processing unit 25 descrambles the information about a specific program. A display unit 26 displays visual information supplied from the audio visual processing unit 25 or from a processing unit 28. The display unit 26 has the same constitution as the display unit 24 mentioned above. In this respect, the two display units may be replaced by a single unit that performs the functions of both. A speaker unit 27 converts an audio signal from the audio visual processing unit 25 or processing unit 28 into voice.

As shown in FIG. 18, the processing unit 28 comprises a CPU 51, a ROM 52, a RAM 53 and an interface (IF) 54. Constituted as such, the processing unit 28 controls the apparatus as a whole and performs various computations.

A storage unit 29 stores as needed general-public-oriented program information (EPG information) transmitted from the broadcasting side. An input unit 31, illustratively composed of a keyboard, a mouse and a remote controller, is operated by viewers when they wish to input information. A modem 32 modulates data from the processing unit 28 into a predetermined signal for transmission over a telephone line to the broadcasting side in FIG. 15.

The program selection support apparatus constituted as described works as follows:

There may occur a case where the broadcasting side needs to transmit some information to a specific viewer or a case where the broadcasting side is requested by a specific viewer to send some information thereto. In such cases, the CPU 1a of the broadcast transmission apparatus in FIG. 15 supplies a predetermined control command to the personalized information generating unit 3 and causes the latter to generate personalized information 41. The personalized information 41 thus generated is encrypted by the encryption unit 4.

Concurrently, the CPU 1a feeds if necessary a predetermined processing command to the general-public-oriented program information generating unit 6 and causes the latter to generate program information destined for the general public. The encrypted personalized information 41 and the general-public-oriented program information are composed by the composing unit 5. The composed result is sent from the composing unit 5 to the composing unit 7.

While broadcasting is in progress, the audio visual information generating unit 8 generates a plurality of programs each constituted by images, voice and data and feeds the programs to the composing unit 7. If necessary, the audio visual information generating unit 8 scrambles specific programs. In that case, the CPU 1a retrieves key information from the database 10 or the like and sends the key information to the audio visual information generating unit 8. On the basis of the key information thus supplied, the audio visual information generating unit 8 scrambles specific program information.

In addition, the CPU 1a retrieves from the database 10 personalized key information (which differs from one viewer to another) for descrambling the scrambled program information. The personalized key information thus retrieved is output to the personalized information generating unit 3.

The personalized information generating unit 3 supplements the personalized information 41 with the personalized key information furnished as key information 43 before the personalized information 41 is output. On the basis of the key information 43 thus added, the audio visual information generating unit 8 scrambles appropriate programs.

When the receiving side is to reproduce any scrambled program (i.e., descramble the program), the key information 43 included in the personalized information 41 is first extracted. The extracted key information is used as the basis for descrambling the desired program.

The program information fed from the audio visual information generating unit 8 and the information from the composing unit 5 are composed by the composing unit 7. The composed result is transmitted to viewers from the transmitting unit 9 over radio waves or through cables.

The information sent from the broadcasting side is received by the tuner 21 on the receiving side in FIG. 16. The received information is fed to the separation processing unit 22. The separation processing unit 22 separates the received information into personalized information 41, general-public-oriented program information and audio visual information. The personalized information 41, general-public-oriented program information and audio visual information acquired from the separation process are supplied respectively to the decoder 23, processing unit 28 and audio visual processing unit 25.

The encrypted personalized information 41 is decoded by the decoder 23. A message 42 and key information 43 are extracted from the decoded information. The message 42 is forwarded to the display unit 24 for display thereon. For example, a displayed message informs the viewer that the viewing fee for a pay-per-view program having been watched is yet to be paid.

The key information 43 is supplied to the processing unit 28. In the processing unit 28, the key information 43 is stored illustratively in the RAM 53.

The general-public-oriented program information separated by the separation processing unit 22 is fed via the processing unit 28 to the storage unit 29. The storage unit 29 stores as data the general-public-oriented program information thus supplied.

Suppose that a viewer inputs a command of an EPG display through the input unit 31 to search for information about a desired program. In such a case, the command thus entered is fed to the processing unit 28. In response to the input command, the CPU 51 of the processing unit 28 reads an EPG from the storage unit 29 for display onto the display unit 26. The viewer finds the desired program from the display (EPG).

After referring to the EPG and deciding on the program to be viewed, the viewer makes necessary input operations from the input unit 31 to select the program in question. The CPU 51 of the processing unit 28 detects the viewer's input and accordingly supplies the audio visual processing unit 25 with a control command for selecting the appropriate program. In accordance with the control command, the audio visual processing unit 25 extracts audio and visual information about the designated program and sends visual information to the display unit 26 and audio information to the speaker unit 27. This initiates reproduction of the program.

Where the program is scrambled, the CPU 51 reads key information 43 from the RAM 53 and supplies it to the audio visual processing unit 25. Given the key information 43, the audio visual processing unit 25 descrambles the program in question and feeds descrambled visual and audio information to the display unit 26 and speaker unit 27 respectively for program reproduction.

With the above program selection support device in use, viewers can get EPG's displayed, find desired programs therefrom, and invoke information about any specific program so that the desired program may be selected on the basis of the furnished information.

One disadvantage of the related art program selection support apparatus is that the EPG (electronic program guide) is simply general-public-oriented program information; all viewers are fed with the same EPG. This makes it difficult for individual viewers to select their desired programs quickly and unfailingly.

SUMMARY OF THE INVENTION

It is therefore an object of the present invention to provide apparatuses and methods whereby each viewer can select swiftly and confidently a specific program from a large number of program offerings.

In carrying out the invention and according to one aspect thereof, there is provided a reception apparatus for receiving a broadcast signal which is transmitted from a transmitting side and which includes personalized information comprising data representing information about specific programs targeted for a specific viewer, the reception apparatus comprising: extraction means for extracting the data representing the information about the specific programs from the broadcast signal received; and display means for displaying the information about the specific programs on the basis of the data representing the information about the specific programs.

According to another aspect of the invention, there is provided a transmission apparatus for transmitting personalized information including data representing information about specific programs targeted for a specific viewer, the transmission apparatus comprising: data generation means for generating the data representing the information about the specific programs targeted for the specific viewer; addition means for adding to the personalized information the data representing the information about the specific programs targeted for the specific viewer; signal generation means for generating a broadcast signal by composing a program signal and the personalized information supplemented with the data representing the information about the specific programs targeted for the specific viewer; and transmission means for transmitting the broadcast signal.

According to a further aspect of the invention, there is provided a transmission-reception apparatus having a transmission apparatus and a reception apparatus, the transmission apparatus transmitting a broadcast signal including personalized information comprising data representing information about specific programs targeted for a specific viewer, the reception apparatus receiving the broadcast signal; wherein the transmission apparatus comprises: data generation means for generating the data representing the information about the specific programs targeted for the specific viewer; addition means for adding to the personalized information the data representing the information about the specific programs targeted for the specific viewer; signal generation means for generating a broadcast signal by composing a program signal and the personalized information supplemented with the data representing the information about the specific programs targeted for the specific viewer; and transmission means for transmitting the broadcast signal; and wherein the reception apparatus comprises: extraction means for extracting the data representing the information about the specific programs from the broadcast signal received; and display means for displaying the information about the specific programs on the basis of the data representing the information about the specific programs.

According to an even further aspect of the invention, there is provided a reception method for receiving a broadcast signal which is transmitted from a transmitting side and which includes personalized information comprising data representing information about specific programs targeted for a specific viewer, the reception method comprising the steps of: extracting the data representing the information about the specific programs from the broadcast signal received; and displaying the information about the specific programs on the basis of the data representing the information about the specific programs.

According to a still further aspect of the invention, there is provided a transmission method for transmitting personalized information including data representing information about specific programs targeted for a specific viewer, the transmission method comprising the steps of: generating the data representing the information about the specific programs targeted for the specific viewer; adding to the personalized information the data representing the information about the specific programs targeted for the specific viewer; generating a broadcast signal by composing a program signal and the personalized information supplemented with the data representing the information about the specific programs targeted for the specific viewer; and transmitting the broadcast signal.

According to a yet further aspect of the invention, there is provided a transmission-reception method both for transmitting a broadcast signal including personalized information comprising data representing information about specific programs targeted for a specific viewer, and for receiving the broadcast signal, the transmission-reception method comprising the steps of: generating the data representing the information about the specific programs targeted for the specific viewer; adding to the personalized information the data representing the information about the specific programs targeted for the specific viewer; generating a broadcast signal by composing a program signal and the personalized information supplemented with the data representing the information about the specific programs targeted for the specific viewer; transmitting the broadcast signal; receiving the broadcast signal; extracting the data representing the information about the specific programs from the broadcast signal received; and displaying the information about the specific programs on the basis of the data representing the information about the specific programs.

These and other objects, features and advantages of the invention will become more apparent upon a reading of the following description and appended drawings.

BRIEF DESCRIPTION OF THE DRAWINGS

FIG. 1 is a block diagram of a transmission apparatus embodying the invention;

FIG. 8 is a view of a typical program list displayed as a result of the process in FIG. 7;

FIG. 9 is a view of a typical program information display given as a result of the process in FIG. 7;

FIG. 12 is a view of a typical merchandise list display that appears as a result of the process in FIG. 11;

FIG. 13 is a view showing how personalized information may be alternatively structured according to the invention;

FIG. 14 is a flowchart of steps constituting the process, in the main processing of FIG. 6, of displaying a program list and acquiring from a broadcasting side information about a designated program;

FIG. 15 is a block diagram of a related art broadcast transmission apparatus;

DESCRIPTION OF THE PREFERRED EMBODIMENTS

Figure 2:
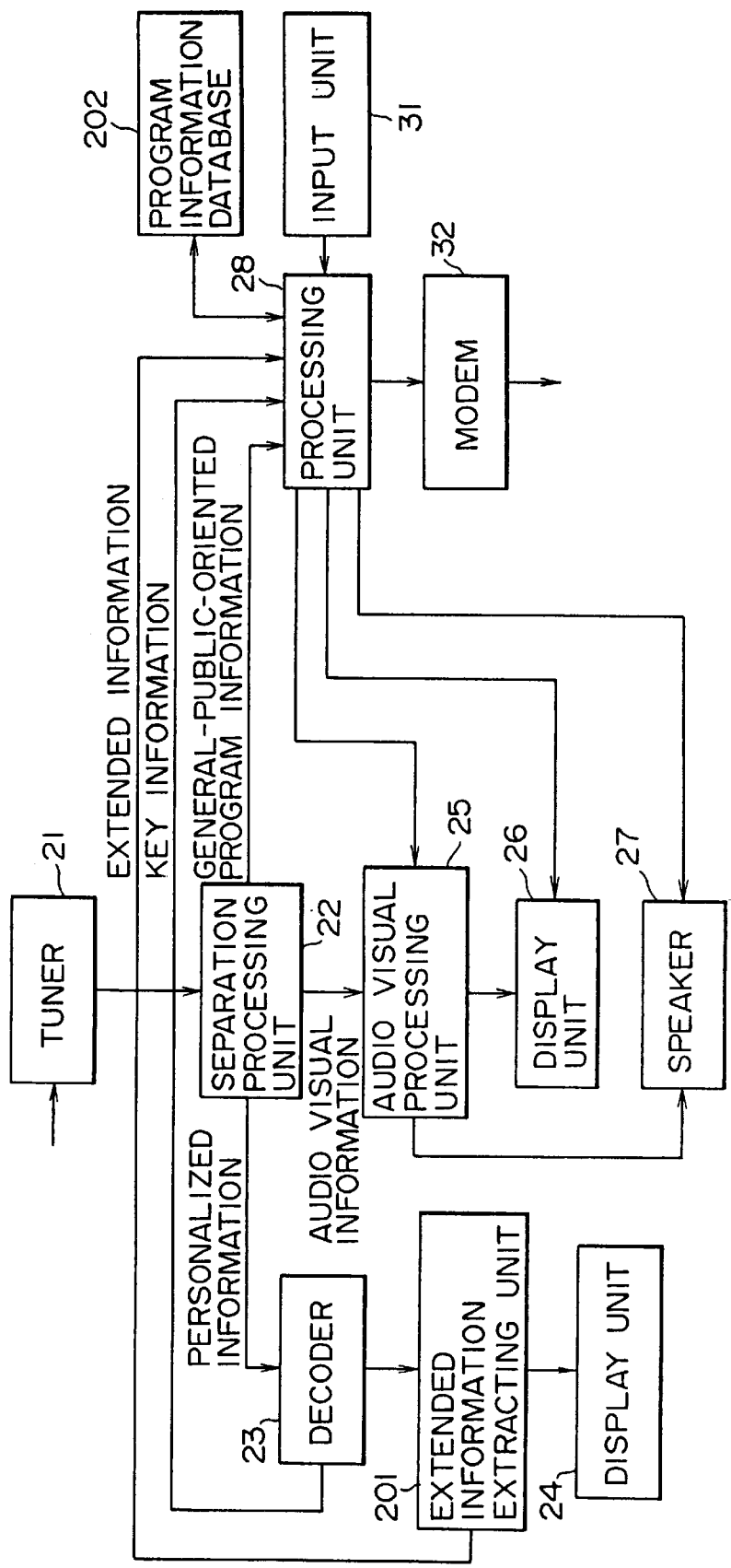
FIG. 2 is a block diagram of a reception apparatus embodying the invention.

FIG. 1 is a block diagram of a transmission apparatus embodying the invention. FIG. 2 is a block diagram of a program selection support apparatus (i.e., broadcast reception apparatus) installed on the receiving side to embody the invention. Of the reference numerals in FIGS. 1 and 2, those already used in the block diagrams of FIGS. 15 and 16 designate like or corresponding parts, and repetitive descriptions of these parts are omitted where appropriate.

The block diagram of FIG. 1 shows an improvement of the setup in FIG. 15 supplemented with an extended information generating unit 101 and an extended information adding unit 102 (addition means). Extended information, as will be described later, is constituted by display data and control data. The extended information adding unit 102 adds extended information generated by the extended information generating unit 101 to personalized information 41 generated by the personalized information generating unit 3. The other components in FIG. 1 are the same as those in FIG. 15.

Figure 16:
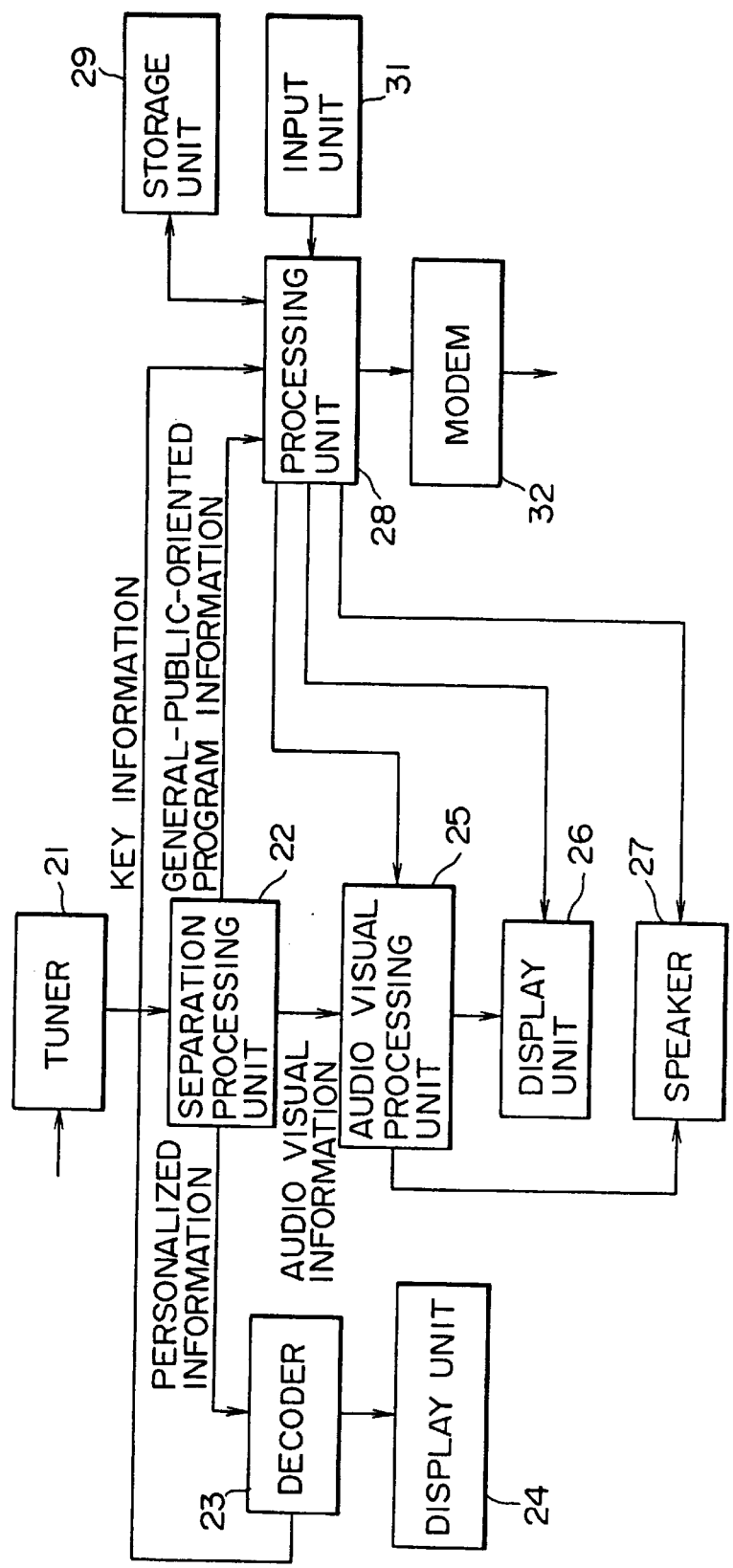
FIG. 16 is a block diagram of a related art broadcast reception apparatus.
Figure 17:
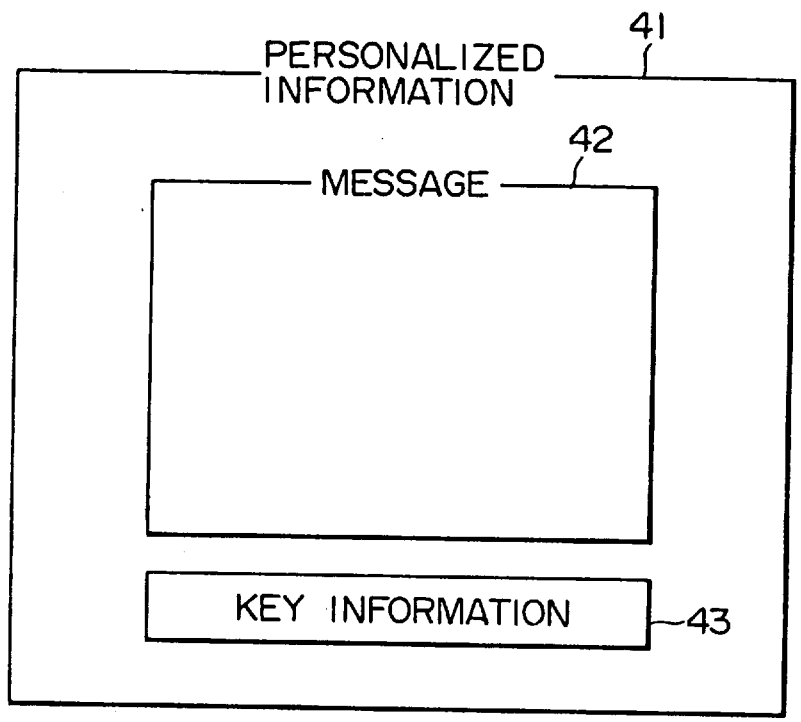
FIG. 17 is a view of a typical data structure of related art personalized information.
Figure 18:
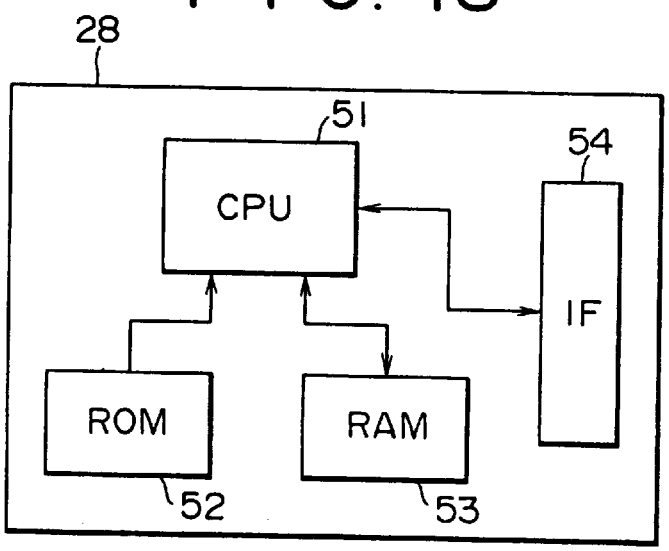
FIG. 18 is a block diagram detailing the structure of the processing unit included in FIG. 16.

The block diagram of FIG. 2 indicates an improvement of the setup in FIG. 16 supplemented with an extended information extracting unit 201 (second extraction means). The extended information extracting unit 201 extracts extended information from the message 42 which in turn is extracted by the decoder 23, and feeds the extracted information to the processing unit 28. In FIG. 2, the storage unit 29 of FIG. 16 is replaced by a program information database 202 capable of searching for a specific EPG in addition to storing EPG's. The other components in FIG. 2 are the same as those in FIG. 16.

Figure 3:
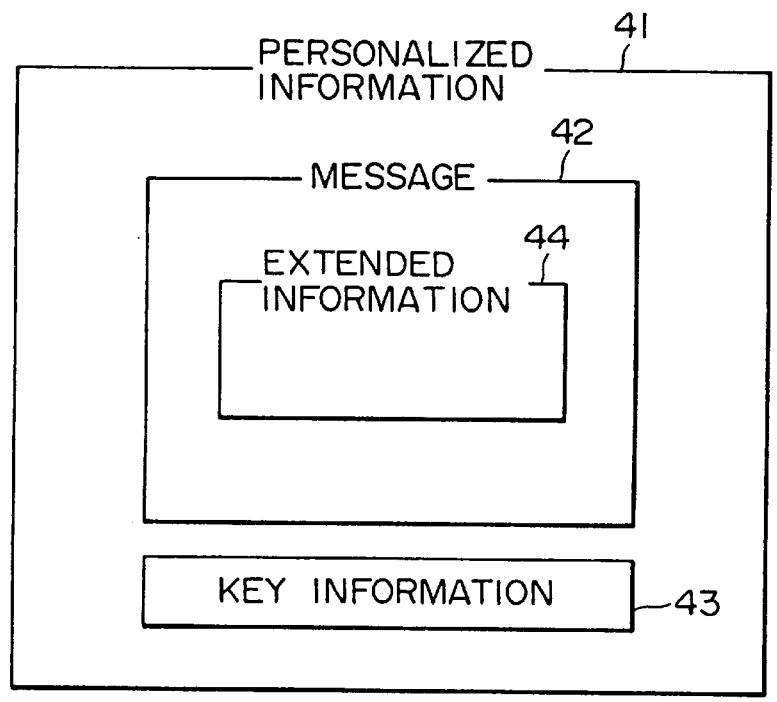
FIG. 3 is a view showing how personalized information is structured according to the invention.

FIG. 3 illustrates how extended information 44, key information 43, a message 42 and personalized information 41 are related to one another. The newly added extended information 44 is included in the message 42 which in turn is included, as is ordinarily the case, in the personalized information 41 independent of the key information 43.

Figure 4:
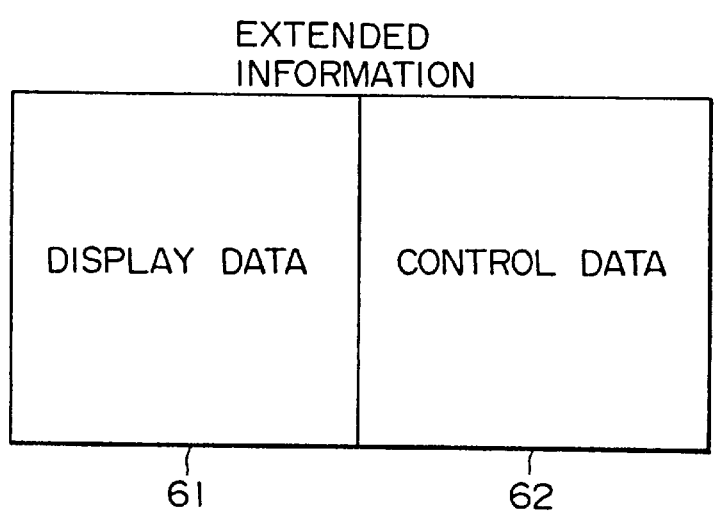
FIG. 4 is a view depicting how extended information is structured according to the invention.

FIG. 4 shows how the extended information 44 is structured. As indicated, the extended information 44 is constituted by display data 61 and control data 62. The display data 61, used for screen display, illustratively comprises character and graphic data. The control data 62 comprises processing commands (programs) for causing the CPU 51 in the processing unit 28 (execution means) of the receiving side to perform predetermined processing. Given any of these processing commands, the CPU 51 searches for and retrieves information about a specific program, selects the designated program, and performs other operations.

The workings of the functional blocks in FIG. 1 will now be described. In the extended information adding unit 102, the extended information 44 generated by the extended information generating unit 101 is added to the personalized information generated by the personalized information generating unit 3. The personalized information supplemented with the extended information 44 is fed to the encryption unit 4. The other workings are the same as those of the comparable blocks in FIG. 15.

Figure 5:
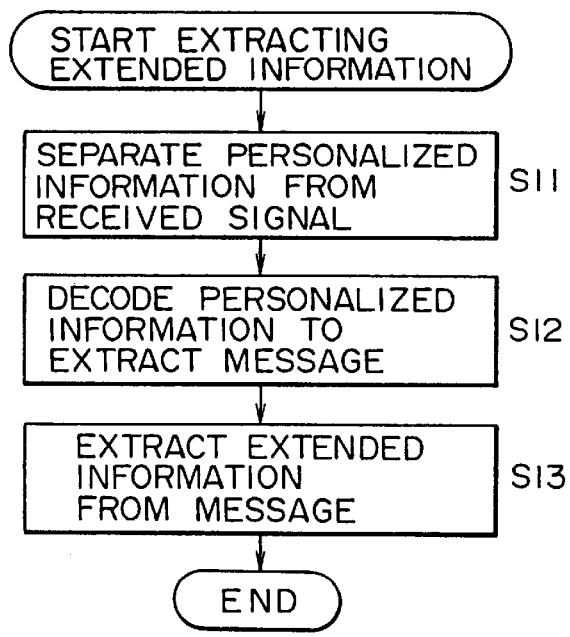
FIG. 5 is a flowchart of steps in which the embodiment of FIG. 2 extracts extended information from the information it has received.

FIG. 5 is a flowchart of steps in which the apparatus of FIG. 2 extracts extended information 44 from the information it has received. In response to a command from the input unit 31, the tuner 21 (reception means) receives a signal on a specific broadcast band, demodulates the signal, and outputs the demodulated result to the separation processing unit 22. Given the information from the tuner 21, the separation processing unit 22 (first extraction means) separates personalized information 41 (step S11) therefrom and feeds the separated information to the decoder 23. The decoder 23 decodes the encrypted personalized information 41 to extract the message 42 and key information 43 (step S12). The message 42 is sent to the extended information extracting unit 201 and the key information 43 to the processing unit 28. The extended information extracting unit 201 extracts the extended information 44 from the message 42 (step S13) and feeds the extracted information to the processing unit 28. After extraction of the extended information 44, the message 42 is supplied to the display unit 24 for display in the form of a personalized message to the viewer in question.

Figure 6:
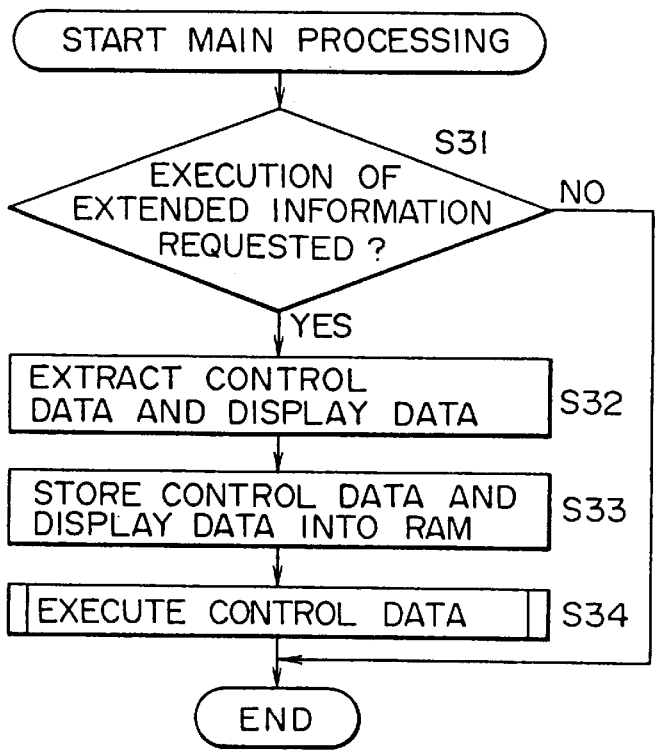
FIG. 6 is a flowchart of steps constituting main processing performed on extended information by a processing unit of the embodiment in FIG. 2.

FIG. 6 is a flowchart of steps in which the CPU 51 of the processing unit 28 performs processing (called here the main processing) on control data 62 included in the extended information 44 extracted by the extended information extracting unit 201.

In the main processing, the CPU 51 of the processing unit 28 checks to see if an input is made through the input unit 31 to request execution of the extended information 44 sent from the broadcasting side (step S31). If no such input is judged to be made ("NO" in step S31), the processing comes to an end ("END" in FIG. 6). If the input is judged to be made ("YES" in step S31), the CPU 51 extracts display data 61 and control data 62 from the extended information 44 fed from the extended information extracting unit 201 (step S32). The two kinds of data are stored separately into the RAM 53 (step S33). The CPU 51 thereafter reads the control data 62 successively from the RAM 53, and carries out the processing described by the control data (program) 62 (step S34). When the processing of the control data 62 is completed, the main processing is brought to an end ("END" in FIG. 6).

The reception of the extended information 44 is indicated to the viewer illustratively by having an appropriate indication (e.g., "MESSAGE RECEIVED") shown on the display unit 26. With this embodiment, when the viewer makes the necessary input through the input unit 31, the display data 61 and control data 62 are extracted from the extended information 44, separated from one another and stored independent of one another into the RAM 53. Alternatively, these steps may be carried out automatically upon receipt of the extended information 44.

What is performed in step S34 of the main processing in FIG. 6 will now be described by citing specific examples. The proceedings carried out by use of extended information 44, i.e., the processes executed in step S34 of FIG. 6 are illustratively as follows:

(A) Presenting each viewer with a list of programs (e.g., recommended program list) edited by the broadcasting side and specifically for that viewer in order to display information about any program designated by the viewer in the list (B) Presenting each viewer with a program selection list edited by the broadcasting side specifically for that viewer so as to receive any program designated by the viewer in the list (C) Presenting each viewer with a merchandise list edited by the broadcasting side specifically for that viewer in order to conclude a purchase contract on any item designated by the viewer in the list The processes (A) through (C) above will now be described more specifically by having recourse to the accompanying flowcharts.

Figure 7:
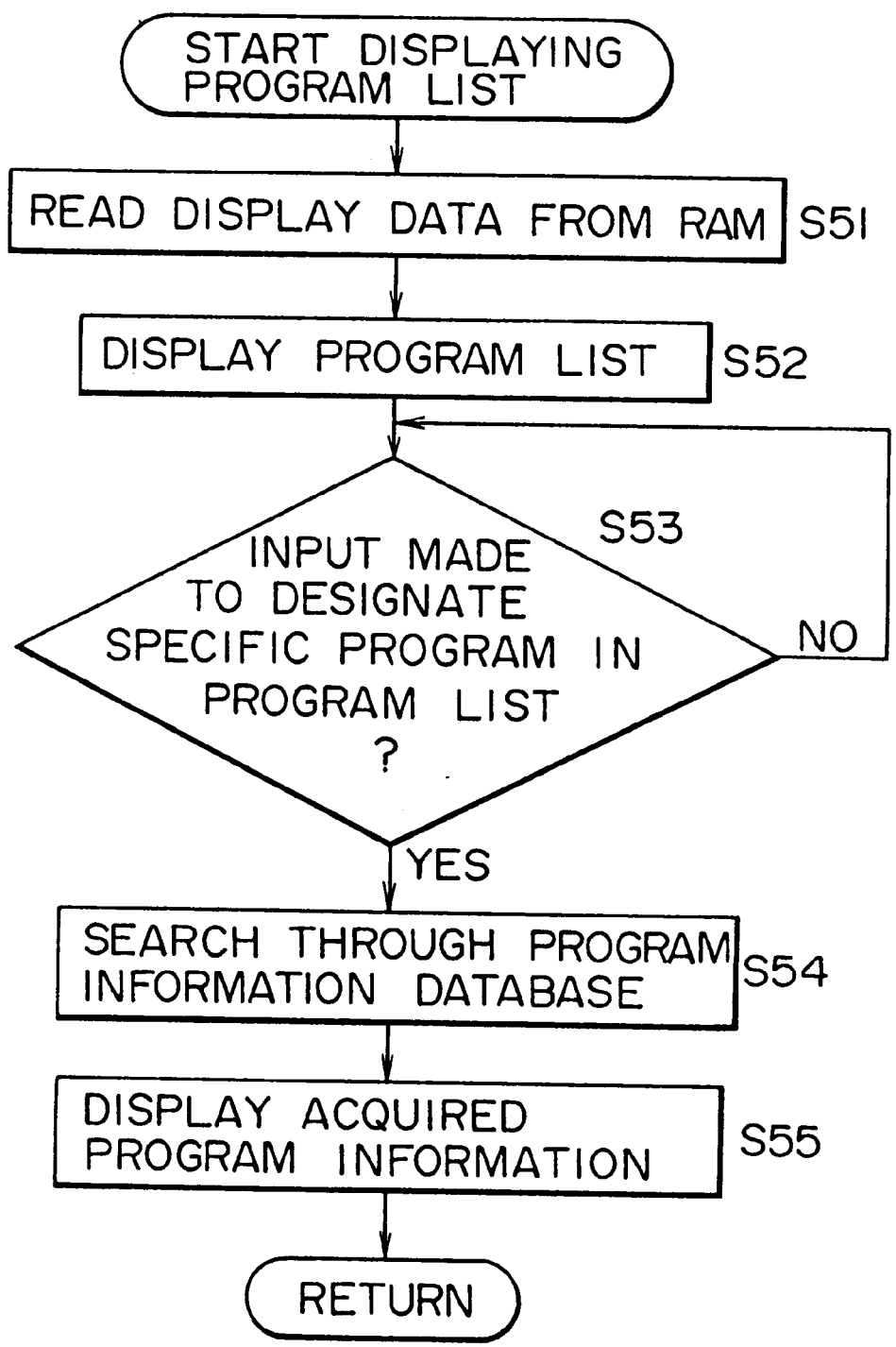
FIG. 7 is a flowchart of steps constituting the process of displaying a program list in the main processing of FIG. 6.

FIG. 7 is a flowchart of steps in which the process (A) above is carried out. In this process, the display unit 26 first displays a program list which is edited by the broadcasting side specifically for each viewer and attached to the display data 61 for transmission to that viewer. When the viewer designates a desired program in the program list, the program information database 202 is searched for the information about the designated program and the retrieved information is displayed.

In the flowchart of FIG. 7, the CPU 51 of the processing unit 28 reads the display data 61 placed in the RAM 53 as a result of the execution of step S33 in the main processing (step S51). On the basis of the procedure described in the control data 62 also stored in the RAM 53, the CPU 51 displays the program list (i.e., recommended program list) onto the display unit 26 (step S52).

FIG. 8 shows a typical program list displayed on the display unit 26 as a result of the execution of step S52. In this example, four programs ("○○○○" (movie), "ΔΔΔΔ" (simulation game), "××××" (live performance) and "□□□□" (share price quotations)) are indicated as candidate programs making up the program list.

The program list is prepared by the broadcasting side specifically for each viewer based on the reception history of individual viewers, viewer-designated preferred genres and other data. Programs in which the viewer in question has little interest are not included in the list. Only the information significant to each viewer is offered.

The CPU 51 checks to see if an input is made through the input unit 31 to designate a specific program in the displayed program list (step S53; the input is made illustratively by entering the number representing the desired program through the use of numeric keys). If no such input is judged to be made ("NO" in step S53), the check is repeated until an input is made. When an input is judged to be made ("YES" in step S53), the CPU 51 sends a suitable processing command to the program information database 202 to search for information about the designated program (step S54). With the appropriate program information retrieved from the database, the CPU 51 displays the acquired information on the display unit 26 (step S55). The CPU 51 then terminates the processing and returns to step S34 of the main processing ("RETURN" in FIG. 7).

FIG. 9 is a view of a typical program information display given when the viewer has selected "1. ○○○○" in the recommended program list of FIG. 8. In this example, the display includes such information as the name of the original work, the starring actor's name, director's name, running time, viewing fee and plot regarding the selected program.

The process (B) mentioned above will now be explained. In this process, the broadcasting side presents each viewer with a program selection list prepared specifically for that viewer. When the viewer selects a desired program in the list, the reception of the program is started.

Figure 10:
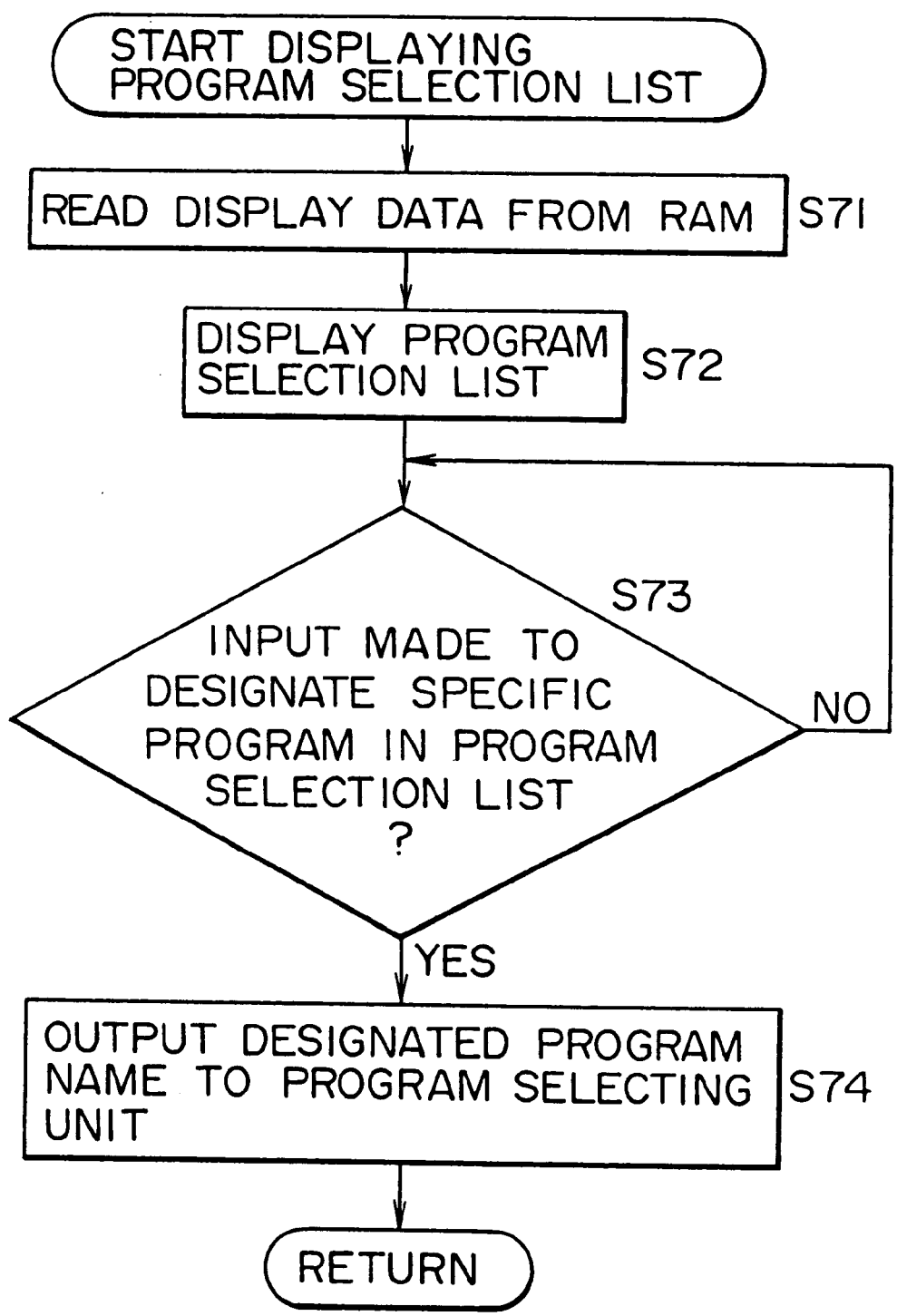
FIG. 10 is a flowchart of steps constituting the process of displaying a program selection list in the main processing of FIG. 6.

FIG. 10 is a flowchart of steps in which the process (B) is carried out. In this process, the CPU 51 of the processing unit 28 first reads the display data 61 placed in the RAM 53 as the result of the execution of step S33 in the main processing (step S71). On the basis of the procedure described in the control data 62 also stored in the RAM 53, the CPU 51 displays a program selection list on the display unit 26 (step S72).

Accordingly, the display unit 26 displays a program selection list (i.e., recommended program list) such as one shown in FIG. 8. This list recommends four programs as described above. Although this example utilizes the same display format as that of the program list in step S52 of FIG. 7, a different display format may be used instead to make the two formats distinct from each other.

The CPU 51 then checks to see if an input is made through the input unit 31 to designate a specific program among the programs included in the program selection list (step S73). If no such input is judged to be made ("NO" in step S73), the check is repeated until an input is made. If an input is judged to be made ("YES" in step S73), the CPU 51 supplies a suitable processing command to the audio visual processing unit 25 to select the designated program. The reception of the program is then started (step S74), and step S34 of the main processing is reached again ("RETURN" in FIG. 10).

Suppose that the viewer has selected "1. ○○○○" from the recommended program list in FIG. 8. In that case, a suitable control command is fed to the audio visual processing unit 25 to select the program, and the reception of the program is started.

The process (C) mentioned above will now be described. In this process, the broadcasting side presents each viewer with a merchandise list prepared specifically for that viewer. When the viewer selects any desired item from the list, a merchandise purchase contract is made regarding the selected item.

Figure 11:
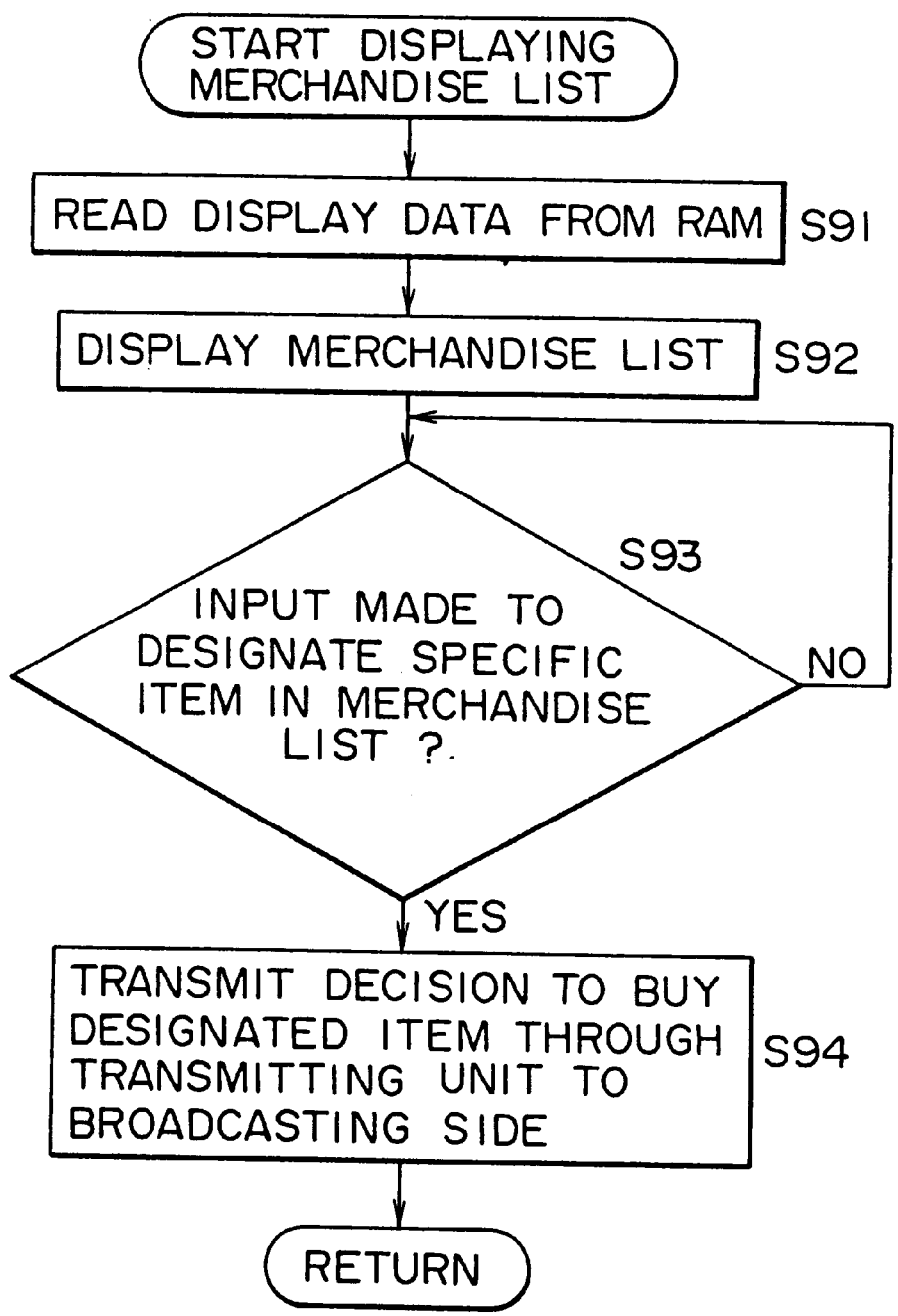
FIG. 11 is a flowchart of steps constituting the process of displaying a merchandise list in the main processing of FIG. 6.

FIG. 11 is a flowchart of steps in which the process (C) is carried out. In this process, the CPU 51 of the processing unit 28 first reads the display data 61 placed in the RAM 53 as the result of the execution of step S33 in the main processing (step S91). On the basis of the procedure described in the control data 62 also stored in the RAM 53, the CPU 51 displays a merchandise list on the display unit 26 (step S92).

FIG. 12 is a view of a typical merchandise list display that appears on the display unit 26 as a result of the execution of step S92. In this example, five items of merchandise (necklace, bracelet, pendant, ring, and earrings) are indicated together with their prices and images (images are omitted in FIG. 12).

The CPU 51 then checks to see if an input is made through the input unit 31 to designate a specific item among the items of merchandise being displayed (step S93). If no such input is judged to be made ("NO" in step S93), the check is repeated until an input is made. If an input is judged to be made ("YES" in step S93), the CPU 51 supplies the modem 32 with data for denoting the purchase of the designated item. The modem 32 modulates the data and transmits the modulated data to the broadcasting side over telephone lines (step S94). Thereafter, the CPU 51 returns to step S34 of the main processing ("RETURN" in FIG. 11).

Suppose that the viewer has selected "1. Necklace" in the merchandise list of FIG. 12. In that case, the CPU 51 feeds the modem 32 with the data indicating the viewer's decision to buy the item. The modem 32 in turn modulates and sends the data over telephone lines to the broadcasting side. The broadcasting side receives the data via the modem 2 of FIG. 1. The data is forwarded to the processing unit 1 (preparation means) for storage into appropriate locations in the database 10. Information held in appropriate locations of the database 10 is thereafter read out periodically by the processing unit 1, so that the item under purchase contract with each specific viewer is dispatched to each viewer.

In the examples above, the extended information 44 of FIG. 3 is structured to be included in the message 42. Alternatively, as indicated in FIG. 13, extended information 44 may be structured to be contained in personalized information 41 independently of the message 42. Further alternatives to and variations of these schemes may also be practiced to provide the same effect.

In the program list display processing of FIG. 7, the program information database 202 is searched for program information. Alternatively, the database 10 on the broadcasting side may be searched for program information. FIG. 14 is a flowchart of steps in which the alternative scheme above is practiced. As with the other processes, this processing is carried out as part of the main processing of FIG. 6.

In the flowchart of FIG. 14, the CPU 51 of the processing unit 28 on the receiving side first reads display data 61 placed in the RAM 53 as the result of the execution of step S33 in the main processing (step S111). On the basis of the procedure described in the control data 62 also stored in the RAM 53, the CPU 51 displays a program list on the display unit 26 (step S112).

The CPU 51 then checks to see if an input is made through the input unit 31 to designate a specific program among the candidate programs making up the program list (step S113). If no such input is judged to be made ("NO" in step S113), the check is repeated until an input is made. If an input is judged to be made ("YES" in step S113), the CPU 51 supplies a suitable processing command to the modem 32. The modem 32 sends a request over telephone lines to the broadcasting side asking the latter to transmit information about the designated program (step S114).

Following the request, the modem 2 on the broadcasting side in FIG. 1 receives the information transmitted by the viewer and forwards it to the processing unit 1. The CPU 1a of the processing unit 1 searches the database 10 for the requested information about the specific program. With the program information retrieved, the CPU 1a feeds the acquired information to the extended information generating unit 101 so that the latter will generate extended information 44 for displaying the appropriate program information on the viewer's display unit 26. The extended information 44 is added by the extended information adding unit 102 to the personalized information 41 before being encrypted by the encryption unit 4. The transmitting unit 9 (transmission means) transmits the encrypted information through the composing units 5 and 7 to the viewer who made the request.

The receiving side performs the processing of FIG. 5 on the information sent from the broadcasting side, so as to extract the extended information 44. The CPU 51 of the processing unit 28 obtains the extended information 44 (step S115) and extracts the display data 61 from the extended information 44 thus acquired. Thereafter, the CPU 51 feeds the display data 61 to the display unit 26 for display thereon (step S116). The CPU 51 then returns to step S34 of the main processing ("RETURN" in FIG. 14).

The processing above makes it possible to display additionally program information and merchandise information not stored in the program information database 202.

In any of the above examples, a program has been shown to be added to the control data 62 so that the process in question is carried out on the basis of that program. Alternatively, a plurality of programs may be stored in advance in, say, the ROM 52. In this case, the control data 62 may be supplemented by data for selecting any one of the plurality of programs, the added data allowing any of the programs held in the ROM 52 to be carried out to implement the corresponding process. This scheme reduces the amount of information to be transmitted from the broadcasting side. In this specification, control data refers either to the program itself or to data for designating the predetermined program prepared on the receiving side.

As described and according to the reception apparatus and method of the invention, a broadcast signal is received which is transmitted from a transmitting side and which includes personalized information comprising data representing information about specific programs targeted for a specific viewer. The data representing the information about the specific programs is extracted from the broadcast signal received. The information about the specific programs is then displayed on the basis of the data representing the information about the specific programs. The information about the specific programs may include a list of the specific programs which may be displayed. The personalized information may include control data used to search for program information. Program information desired by a user may be searched for through the information about the specific programs by use of the control data. The personalized information may include control data for program selection. A program desired by a user may be selected from the list of the specific programs by use of the control data. The personalized information may include a list of specific items of merchandise which may be displayed. The personalized information may include control data for merchandise item selection. An item of merchandise desired by a user may be selected from the list of the specific items of merchandise by use of the control data. The personalized information may be encrypted when transmitted and decoded when received. The schemes allow each viewer to select in secrecy any desired program or item of merchandise quickly and unfailingly on the basis of the information sent from the transmitting side.

According to the transmission apparatus and method of the invention, personalized information is transmitted which includes data representing information about specific programs targeted for a specific viewer. The data representing the information about the specific programs targeted for the specific viewer is first generated. The personalized information is supplemented with the data representing the information about the specific programs targeted for the specific viewer. A broadcast signal is generated by composing a program signal and the personalized information supplemented with the data representing the information about the specific programs targeted for the specific viewer. The broadcast signal thus generated is then transmitted. The personalized information may be encrypted when transmitted and decoded when received. This allows each viewer to select in secrecy any desired program quickly and confidently.

According to the transmission-reception apparatus and method of the invention, a broadcast signal is transmitted which includes personalized information comprising data representing information about specific programs targeted for a specific viewer, and the broadcast signal thus transmitted is then received. The data representing the information about the specific programs targeted for the specific viewer is first generated. The personalized information is supplemented with the data representing the information about the specific programs targeted for the specific viewer. A broadcast signal is generated by composing a program signal and the personalized information supplemented with the data representing the information about the specific programs targeted for the specific viewer. The broadcast signal is transmitted and then received. The data representing the information about the specific programs is extracted from the broadcast signal received. The information about the specific programs is then displayed on the basis of the data representing the information about the specific programs. The personalized information may be encrypted when transmitted and decoded when received. This allows the transmitting and receiving sides to exchange in secrecy information including program selection data and permits the receiving side to acquire necessary information from the broadcasting side.

As many apparently different embodiments of this invention may be made without departing from the spirit and scope thereof, it is to be understood that the invention is not limited to the specific embodiments thereof except as defined in the appended claims.

What is claimed is:

1. A reception apparatus for receiving a broadcast signal which is transmitted from a transmitting side and which includes personalized information comprising data representing information about specific programs targeted for a specific viewer, said reception apparatus comprising:
   extraction means for extracting said data representing said information about said specific programs from said broadcast signal received; and
   display means for displaying said information about said specific programs on the basis of said data representing said information about said specific programs.

2. A reception apparatus according to claim 1, wherein said information about said specific programs includes a list of said specific programs, and wherein said display means displays said list of said specific programs.

3. A reception apparatus according to claim 2, wherein said personalized information includes control data used for program selection, said reception apparatus further comprising selection means for selecting, by use of said control data, a program desired by a user from said list of said specific programs.

4. A reception apparatus according to claim 1, wherein said personalized information includes control data used to search for program information, said reception apparatus further comprising search means for searching, by use of said control data, for information desired by a user from said information about said specific programs.

5. A reception apparatus according to claim 1, wherein said personalized information includes a list of specific items of merchandise, and wherein said display means displays said list of said specific items of merchandise.

6. A reception apparatus according to claim 5, wherein said personalized information includes control data used for merchandise item selection, said reception apparatus further comprising selection means for selecting, by use of said control data, an item of merchandise desired by a user from said list of said specific items of merchandise.

7. A reception apparatus according to claim 1, wherein said personalized information is encrypted, said reception apparatus further comprising decoding means for decoding said personalized information encrypted.

8. A transmission apparatus for transmitting personalized information including data representing information about specific programs targeted for a specific viewer, said transmission apparatus comprising:
   data generation means for generating said data representing said information about said specific programs targeted for said specific viewer;
   addition means for adding to said personalized information said data representing said information about said specific programs targeted for said specific viewer;
   signal generation means for generating a broadcast signal by composing a program signal and said personalized information supplemented with said data representing said information about said specific programs targeted for said specific viewer; and
   transmission means for transmitting said broadcast signal.

9. A transmission apparatus according to claim 8, further comprising encryption means for encrypting said personalized information.

10. A transmission-reception apparatus having a transmission apparatus and a reception apparatus, said transmission apparatus transmitting a broadcast signal including personalized information comprising data representing information about specific programs targeted for a specific viewer, said reception apparatus receiving said broadcast signal; wherein said transmission apparatus comprises:
   data generation means for generating said data representing said information about said specific programs targeted for said specific viewer;
   addition means for adding to said personalized information said data representing said information about said specific programs targeted for said specific viewer;
   signal generation means for generating a broadcast signal by composing a program signal and said personalized information supplemented with said data representing said information about said specific programs targeted for said specific viewer; and
   transmission means for transmitting said broadcast signal; and
   wherein said reception apparatus comprises:
   extraction means for extracting said data representing said information about said specific programs from said broadcast signal received; and
   display means for displaying said information about said specific programs on the basis of said data representing said information about said specific programs.

11. A transmission-reception apparatus according to claim 10, wherein said transmission apparatus further comprises encryption means for encrypting said personalized information, and wherein said reception means further comprises decoding means for decoding said personalized information encrypted.

12. A reception method for receiving a broadcast signal which is transmitted from a transmitting side and which includes personalized information comprising data representing information about specific programs targeted for a specific viewer, said reception method comprising the steps of:
   extracting said data representing said information about said specific programs from said broadcast signal received; and
   displaying said information about said specific programs on the basis of said data representing said information about said specific programs.

13. A reception method according to claim 12, wherein said personalized information is encrypted, said reception method further comprising the step of decoding said personalized information encrypted.

14. A transmission method for transmitting personalized information including data representing information about specific programs targeted for a specific viewer, said transmission method comprising the steps of:
   generating said data representing said information about said specific programs targeted for said specific viewer;
   adding to said personalized information said data representing said information about said specific programs targeted for said specific viewer;
   generating a broadcast signal by composing a program signal and said personalized information supplemented with said data representing said information about said specific programs targeted for said specific viewer; and
   transmitting said broadcast signal.

15. A transmission method according to claim 14, further comprising the step of encrypting said personalized information.

16. A transmission-reception method both for transmitting a broadcast signal including personalized information comprising data representing information about specific programs targeted for a specific viewer, and for receiving said broadcast signal, said transmission-reception method comprising the steps of:

generating said data representing said information about said specific programs targeted for said specific viewer;

adding to said personalized information said data representing said information about said specific programs targeted for said specific viewer;

generating a broadcast signal by composing a program signal and said personalized information supplemented with said data representing said information about said specific programs targeted for said specific viewer;

transmitting said broadcast signal;

receiving said broadcast signal;

extracting said data representing said information about said specific programs from said broadcast signal received; and displaying said information about said specific programs on the basis of said data representing said information about said specific programs.

17. A transmission-reception method according to claim 16, further comprising the steps of encrypting said personalized information and of decoding said personalized information encrypted.

* * * * *